(12) United States Patent
Falco et al.

(10) Patent No.: US 9,063,852 B2
(45) Date of Patent: Jun. 23, 2015

(54) SYSTEM AND METHOD FOR USE WITH A DATA GRID CLUSTER TO SUPPORT DEATH DETECTION

(75) Inventors: Mark Falco, Burlington, MA (US);
Robert H. Lee, San Carlos, CA (US);
Harvey Eneman, Belmont, CA (US);
Gene Gleyzer, Lexington, MA (US);
Cameron Purdy, Lexington, MA (US);
Alex Gleyzer, Waltham, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 92 days.

(21) Appl. No.: 13/352,195

(22) Filed: Jan. 17, 2012

(65) Prior Publication Data

US 2012/0198055 A1 Aug. 2, 2012

Related U.S. Application Data

(60) Provisional application No. 61/437,542, filed on Jan. 28, 2011.

(51) Int. Cl.
*G06F 15/173* (2006.01)
*G06F 11/07* (2006.01)
*H04L 12/26* (2006.01)
*G06F 11/30* (2006.01)

(52) U.S. Cl.
CPC ........ *G06F 11/0709* (2013.01); *H04L 43/0817* (2013.01); *G06F 11/0757* (2013.01); *G06F 11/0793* (2013.01); *G06F 11/3006* (2013.01); *G06F 11/302* (2013.01); *G06F 11/3048* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 5,784,569 A * | 7/1998 | Miller et al. | 709/235 |
| 5,819,272 A | 10/1998 | Benson | |
| 5,940,367 A * | 8/1999 | Antonov | 370/218 |
| 5,991,894 A * | 11/1999 | Lee et al. | 714/6.31 |
| 5,999,712 A | 12/1999 | Moiin et al. | |
| 6,182,139 B1 | 1/2001 | Brendel | |
| 6,377,993 B1 | 4/2002 | Brandt et al. | |
| 6,487,622 B1 | 11/2002 | Coskrey, IV et al. | |
| 6,490,620 B1 | 12/2002 | Ditmer et al. | |
| 6,615,258 B1 | 9/2003 | Barry et al. | |
| 6,631,402 B1 | 10/2003 | Devine et al. | |
| 6,693,874 B1 * | 2/2004 | Shaffer et al. | 370/217 |
| 6,714,979 B1 | 3/2004 | Brandt et al. | |
| 6,968,571 B2 | 11/2005 | Devine et al. | |
| 7,114,083 B2 | 9/2006 | Devine et al. | |
| 7,139,925 B2 * | 11/2006 | Dinker et al. | 714/4.3 |
| 7,266,822 B1 | 9/2007 | Boudnik et al. | |
| 7,328,237 B1 | 2/2008 | Thubert et al. | |
| 7,376,953 B2 | 5/2008 | Togasaki | |

(Continued)

*Primary Examiner* — Joshua Joo
(74) *Attorney, Agent, or Firm* — Tucker Ellis LLP

(57) ABSTRACT

A system and method is described for use with a data grid cluster to support death detection. A network ring is formed by connecting a plurality of process nodes in the data grid, wherein each node in the network ring watches another node. A death of a first process node in the network ring can be detected by a second process node, when the second process node notices that its connection to the first process node has closed. The first process node then informs other process cluster nodes in the network ring that the first node is dead. In accordance with an embodiment, machine level death detection can also be supported in the data grid cluster by using an Internet Protocol (IP) monitor.

20 Claims, 5 Drawing Sheets

(56) References Cited

U.S. PATENT DOCUMENTS

| | | |
|---|---|---|
| 7,543,046 B1 | 6/2009 | Bae et al. |
| 7,720,971 B2 | 5/2010 | Moutafov |
| 7,739,677 B1 | 6/2010 | Kekre et al. |
| 7,792,977 B1 | 9/2010 | Brower et al. |
| 7,814,248 B2 * | 10/2010 | Fong et al. .................... 710/110 |
| 7,953,861 B2 | 5/2011 | Yardley |
| 8,195,835 B2 * | 6/2012 | Ansari et al. ................. 709/245 |
| 8,209,307 B2 | 6/2012 | Erofeev |
| 8,312,439 B2 | 11/2012 | Kielstra et al. |
| 2002/0035559 A1 | 3/2002 | Crowe et al. |
| 2002/0073223 A1 * | 6/2002 | Darnell et al. ................ 709/232 |
| 2002/0078312 A1 | 6/2002 | Wang-Knop et al. |
| 2003/0023898 A1 | 1/2003 | Jacobs et al. |
| 2003/0046286 A1 | 3/2003 | Jacobs et al. |
| 2003/0120715 A1 | 6/2003 | Johnson et al. |
| 2003/0187927 A1 | 10/2003 | Winchell |
| 2003/0191795 A1 | 10/2003 | Bernardin et al. |
| 2004/0059805 A1 | 3/2004 | Dinker et al. |
| 2004/0179471 A1 * | 9/2004 | Mekkittikul et al. ......... 370/218 |
| 2004/0267897 A1 | 12/2004 | Hill et al. |
| 2005/0021737 A1 * | 1/2005 | Ellison et al. ................. 709/224 |
| 2005/0083834 A1 | 4/2005 | Dunagan et al. |
| 2005/0097185 A1 | 5/2005 | Gibson et al. |
| 2005/0138460 A1 * | 6/2005 | McCain ............................ 714/2 |
| 2005/0193056 A1 * | 9/2005 | Schaefer et al. ............... 709/203 |
| 2006/0095573 A1 * | 5/2006 | Carle et al. .................... 709/227 |
| 2007/0016822 A1 | 1/2007 | Rao et al. |
| 2007/0118693 A1 | 5/2007 | Brannon et al. |
| 2007/0140110 A1 | 6/2007 | Kaler |
| 2007/0174160 A1 | 7/2007 | Solberg et al. |
| 2007/0237072 A1 * | 10/2007 | Scholl ........................... 370/222 |
| 2007/0260714 A1 * | 11/2007 | Kalmuk et al. ............... 709/223 |
| 2007/0271584 A1 | 11/2007 | Anderson et al. |
| 2008/0183876 A1 | 7/2008 | Duvur et al. |
| 2008/0276231 A1 | 11/2008 | Huang et al. |
| 2008/0281959 A1 | 11/2008 | Robertson |
| 2009/0265449 A1 | 10/2009 | Krishnappa et al. |
| 2009/0320005 A1 | 12/2009 | Toub et al. |
| 2010/0128732 A1 * | 5/2010 | Jiang ............................ 370/400 |
| 2010/0211931 A1 | 8/2010 | Levanoni et al. |
| 2010/0312861 A1 * | 12/2010 | Kolhi et al. ................... 709/219 |
| 2011/0041006 A1 | 2/2011 | Fowler |
| 2011/0107135 A1 | 5/2011 | Andrews et al. |
| 2011/0161289 A1 | 6/2011 | Pei et al. |
| 2011/0179231 A1 | 7/2011 | Roush |
| 2011/0249552 A1 * | 10/2011 | Stokes et al. .................. 370/228 |
| 2012/0036237 A1 * | 2/2012 | Hasha et al. ................... 709/221 |
| 2012/0117157 A1 | 5/2012 | Ristock |
| 2012/0158650 A1 | 6/2012 | Andre et al. |
| 2012/0215740 A1 | 8/2012 | Vaillant et al. |

* cited by examiner

SYSTEM AND METHOD FOR USE WITH A DATA GRID CLUSTER TO SUPPORT DEATH DETECTION

CLAIM OF PRIORITY

This application claims the benefit of priority to U.S. Provisional Patent Application No. 61/437,542, titled "DEATH DETECTION IN A DATA GRID CLUSTER", filed Jan. 28, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer cluster environments, and data and resource management in such environments, and is particularly related to a system and method for use with a data grid cluster to support death detection.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

In order to meet these requirements, a distributed data management and cache service can be run in the application tier so as to run in-process with the application itself, e.g., as part of an application server cluster. However, from time to time, one or more of the server machines in the application server cluster can be shut down, and/or the processes running on top of the server machines can be dysfunctional. There is a need to quickly detect such an event when it happens. This is the general area that embodiments of the invention are intended to address.

SUMMARY

In accordance with an embodiment, a system and method is described for use with a data grid cluster to support death detection. A network ring is formed by connecting a plurality of process nodes in the data grid, wherein each node in the network ring watches another node. A death of a first process node in the network ring can be detected by a second process node, when the second process node notices that its connection to the first process node has closed. The first process node then informs other process cluster nodes in the network ring that the first node is dead. In accordance with an embodiment, machine level death detection can also be supported in the data grid cluster by using an Internet Protocol (IP) monitor.

DETAILED DESCRIPTION

Figure 1:
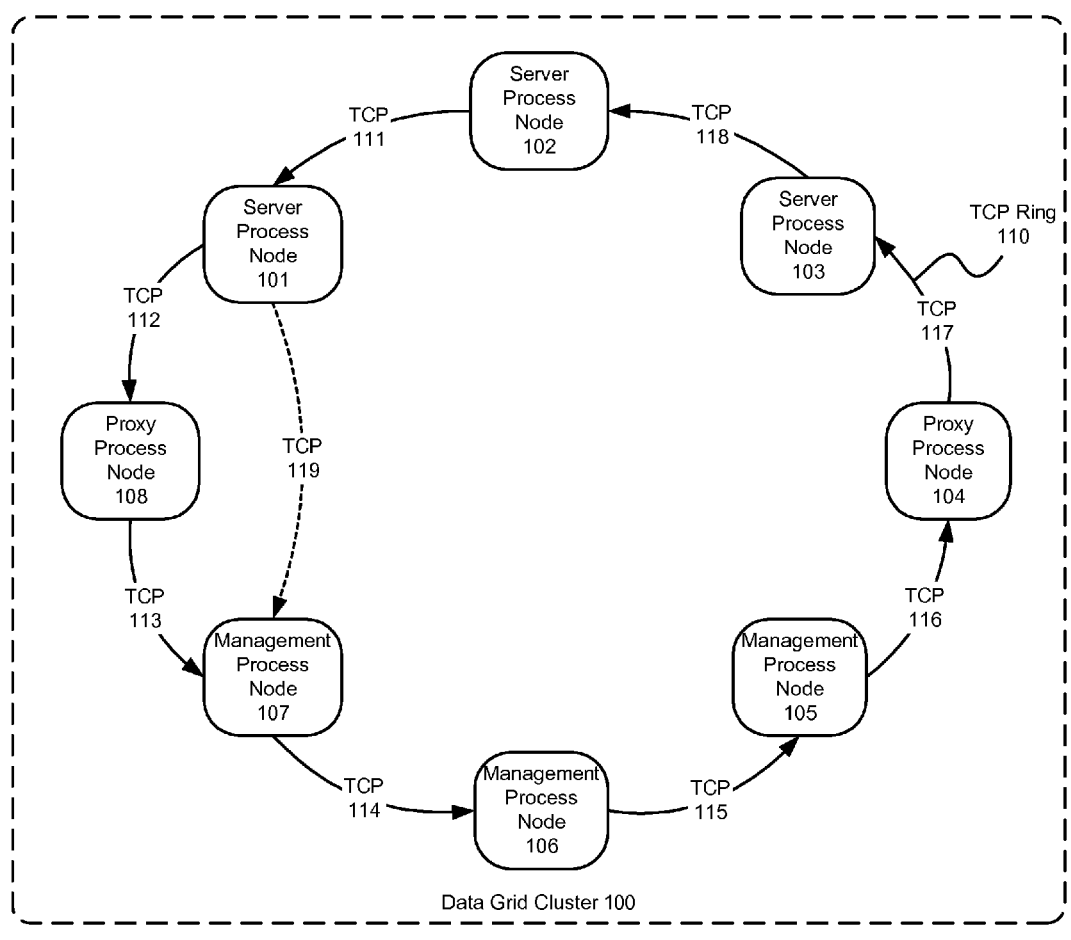
FIG. 1 is an illustration of a TCP ring in a data grid, in accordance with various embodiments.

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol, with no single points of failure, and can automatically and transparently fail over and redistribute its clustered data management services whenever a server becomes inoperative or disconnected from the network.

Death Detection

In accordance with an embodiment, the system employs death detection as a cluster mechanism that can quickly detect whenever a cluster member in a data grid cluster has failed. Failed cluster members can be removed from the cluster, and the remaining cluster members notified about the departed member. By using death detection, a data grid cluster can differentiate between an actual member failure and a temporarily unresponsive member, such as the case when a Java Virtual Machine (JVM) conducts a full garbage collection. Using death detection, the system can achieve (1) instantaneous detection of failed processes; (2) quick death detection of failed machines; (3) minimizing the chance of garbage collection based false positives; and (4) improved cluster stability.

In accordance with an embodiment, the data grid cluster can use a network ring, such as a Transmission Control Protocol (TCP) ring, for fast process-level death detection. Furthermore, the data grid cluster can use an Internet Protocol (IP) Monitor to detect machine or network-related deaths.

Additionally, a packet timeout approach can be used as a catch-all death detection for process, machine, and network failures.

TCP Ring

In accordance with an embodiment, a data grid cluster can use a TCP ring for fast process-level death detection that is useful in those cases when the process in a data grid cluster does not have any time to perform any shut down logic and is abruptly terminated. The remainder of the cluster can identify that the object has terminated from the cluster. Additionally, the TCP Ring can be used to reduce false positives caused by long garbage collection pauses, swapping, and under-provisioned deployment environments, and can reduce death detection time.

FIG. 1 is an illustration of a TCP ring in a data grid, in accordance with various embodiments. As shown in FIG. 1, the data grid cluster 100 includes a plurality of process nodes 101-108, each of which can be a process running on a computer or a server machine. There can be different types of process nodes in the data grid, such as server process nodes 101-103, proxy nodes 104 and 108, and management process nodes 105-107.

In accordance with an embodiment, the process nodes can be linked in the data grid cluster using a plurality of network connections 111-118 based on a network protocol, such as TCP. The linked process nodes can form a network ring, such as a TCP ring 110. As shown in FIG. 1, each process node in the TCP ring can watch another process node. A special socket is kept open on each process node in the TCP ring during the normal operation time of the data grid cluster, so that, if a process node in the TCP ring detects that the socket on another process node is closed, the process node can confidently determine that the other process node is dead. For example, if a server process node 101 notices that its TCP connection to the proxy process node 108 has closed, the server process node 101 can inform the remainder of the cluster that the proxy process node 108 is dead. Then, a new TCP ring can be formed using a new TCP connection 119 that bypasses the proxy process node 108.

As shown in FIG. 1, death detection time for the TCP ring is a network roundtrip time, which is generally in the sub-millisecond range. Additionally, a kernel or an operating system (OS) on the computer or the server machine can be sure whether the process runs on top of it is alive or dead.

In accordance with an embodiment, different ordering schemes can be used to arrange the connection of the process nodes in a TCP ring. An exemplary ordering scheme can be based on seniority of each process node in order to decide a monitoring order for the process nodes in the TCP ring. For example, each process node can be monitored by a next senior process node in the TCP ring, while the senior-most node is monitored by the youngest node.

Figure 2:
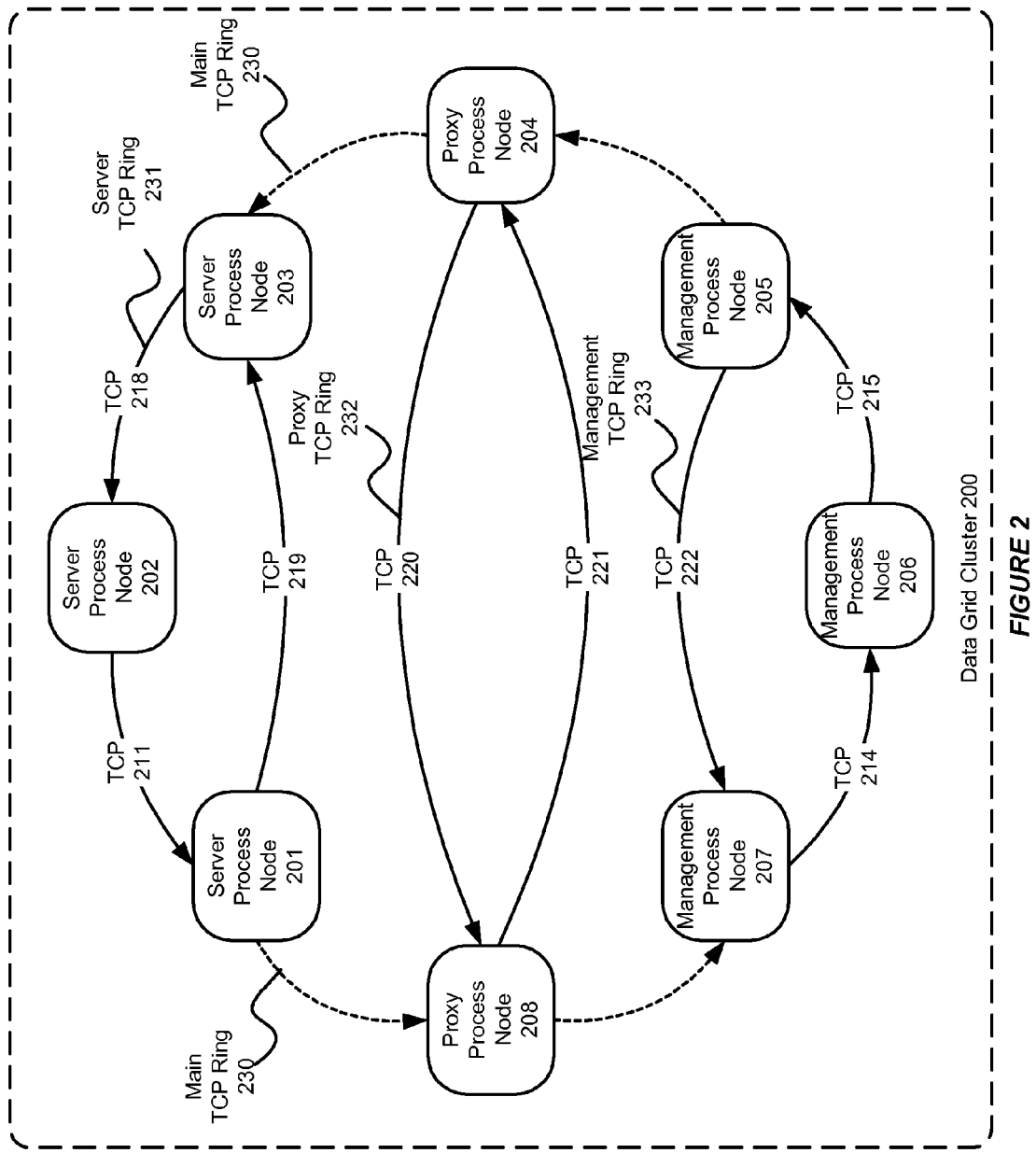
FIG. 2 is an illustration of multiple TCP rings in a data grid, in accordance with various embodiments.

FIG. 2 is an illustration of multiple TCP rings in a data grid, in accordance with various embodiments of the invention. As shown in FIG. 2, in some embodiments a main TCP ring 230 connects every process node in the data grid cluster 200. Additionally, there can be several secondary TCP rings in addition to the main ring, such as a server TCP ring 231, a proxy TCP ring 232, and a management TCP ring 233.

In accordance with an embodiment, each secondary TCP ring can target a particular or special group of processes in the cluster, and each special group of processes can be identified by a role. As shown in FIG. 2, several server process nodes 201-203 in the data grid cluster can form a server TCP ring 231 based on TCP connections 211, 219 and 218. Furthermore, different proxy servers 104 and 108 in the data grid cluster can form a proxy TCP ring 232 based on TCP connections 220-221; while different management servers 205-207 in the data grid cluster can form a management TCP ring 233 based on TCP connections 214, 215, and 222.

Different group of processes in the cluster can be associated with different properties and configurations. For example, a high priority process such as a cache server can be configured with a very short garbage collection time, while a low priority process such as a management server can be configured using a relatively longer garbage collection time. If a management server is used to watch a cache server, then the cache sever may terminate while the monitoring management server is experiencing garbage collection. Thus, it is preferable to have a high priority node watching another high priority node, for example using a high priority cache server to watch another high priority cache server in a server TCP ring.

As shown in FIG. 2, in accordance with an embodiment, a TCP connection between two process nodes can belong to several rings. For example, the TCP connections 211 and 218 belong to both the main TCP ring of the cluster and the server TCP ring; while the TCP connections 214 and 215 belong to both the main TCP ring and the management TCP ring.

In accordance with an embodiment, the data grid cluster can automatically assign a process to an existing network ring in the cluster based on a role associated with the process node. Additionally, users can define customized roles for process nodes in a data grid. The user-defined roles can be used to create user-defined network rings in the grid.

Figure 3:
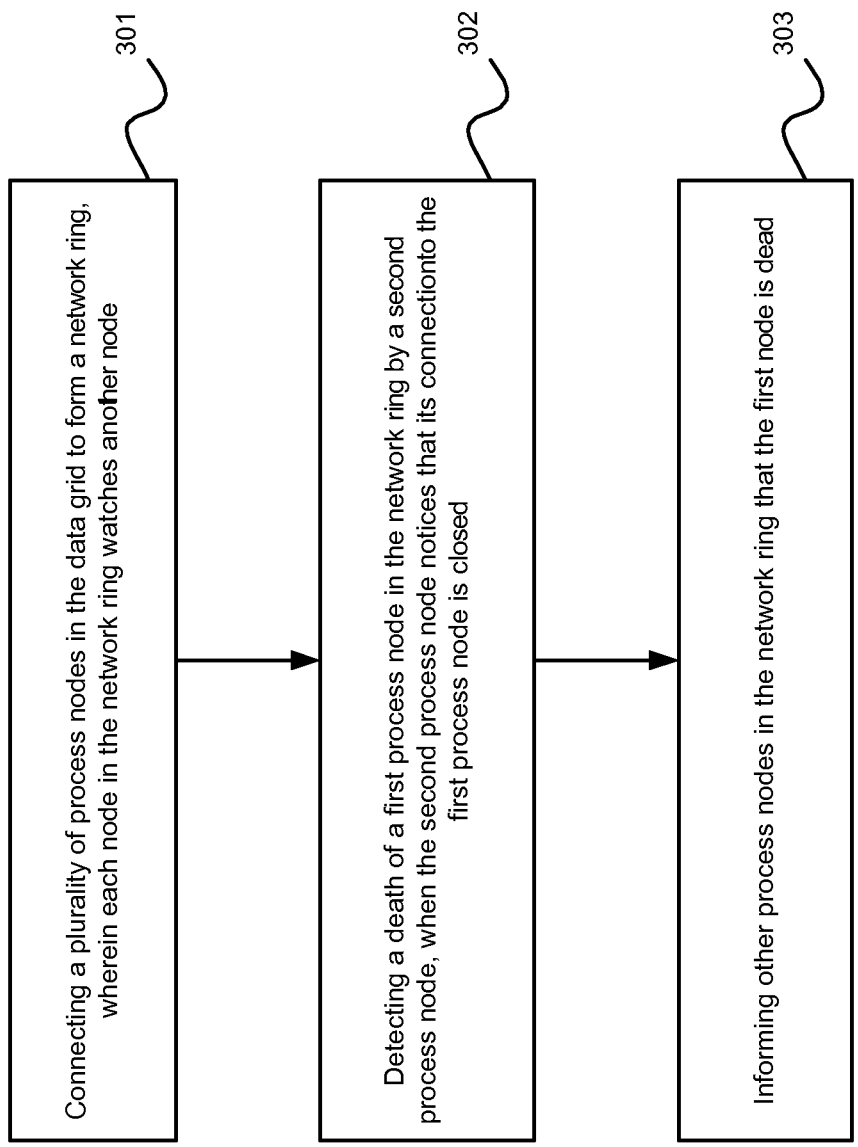
FIG. 3 illustrates an exemplary flow chart for using TCP ring to support death detection in a data grid cluster, in accordance with an embodiment.

FIG. 3 illustrates an exemplary flow chart for using TCP ring to support death detection in a data grid cluster in accordance with an embodiment. As shown in FIG. 3, at step 301, a plurality of process nodes in a data grid cluster are connected to form a TCP ring, where each node watches another node in the TCP ring. At step 302, a death of a first process node in the TCP ring can be detected by a second process node, when the second process node notices that its connection to the first process node is closed. Finally, at step 303, the second process node can inform the other process nodes in the TCP ring that the first node is dead at step 303.

Machine Level Death Detection Using IP Monitor

In accordance with an embodiment, a data grid cluster can use a death detection mechanism such as an IP monitor to detect machine or network related deaths. The IP monitor death detection feature can use a timeout-based mechanism (such as failed pings) to monitor machine death itself.

Figure 4:
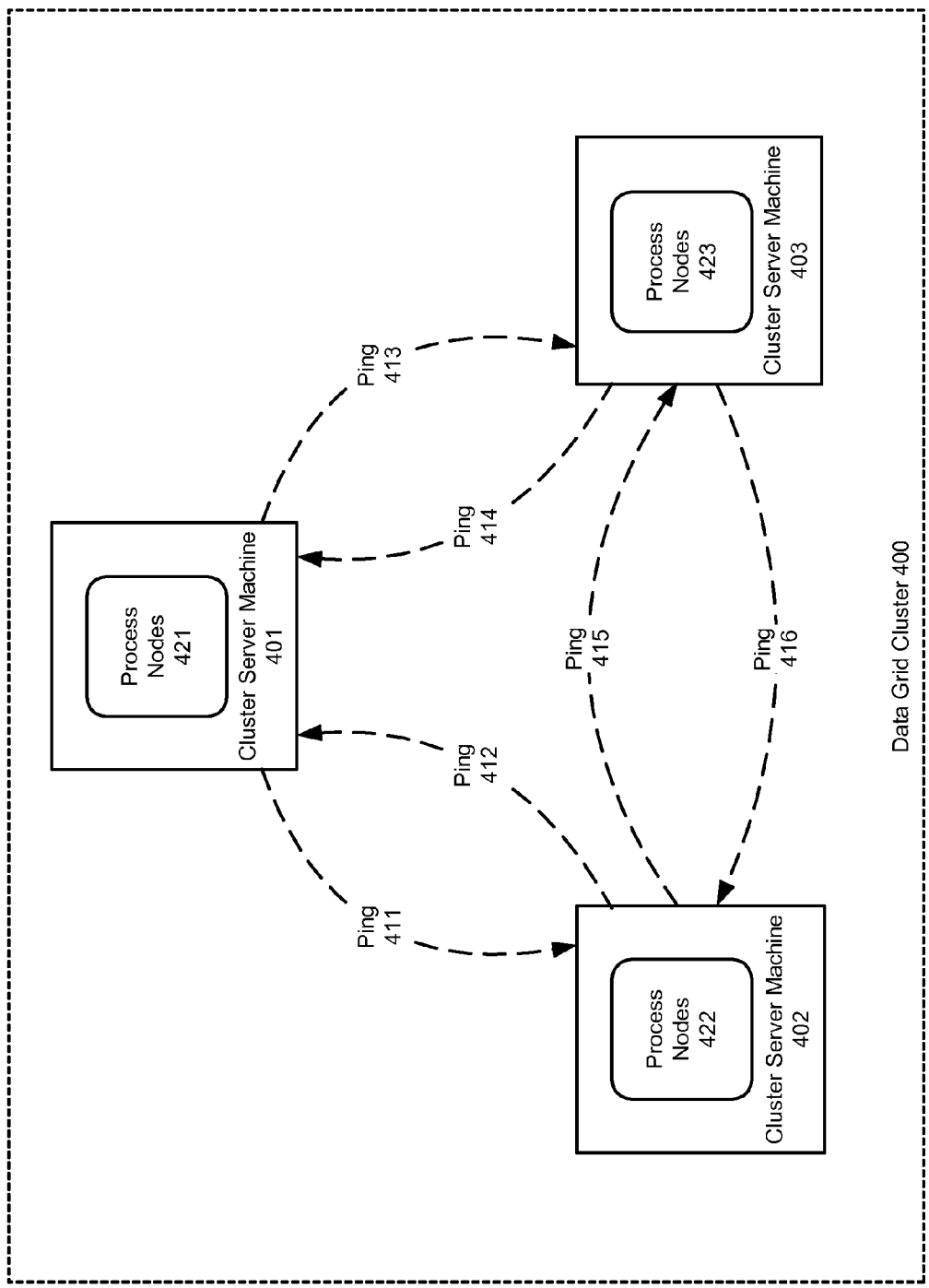
FIG. 4 is an illustration of IP monitor for use with a data grid cluster to support death detection, in accordance with various embodiments.

FIG. 4 is an illustration of an IP monitor for use with a data grid cluster to support death detection, in accordance with various embodiments of the invention. As shown in FIG. 2, the data grid cluster 400 is supported by a cluster of server machines 401-403. Each server machine in the cluster can have one or more data grid cluster process nodes 421-423 running on top of it. If a server machine in the cluster is determined to be dead, then all processes running on top of the machine are considered dead as well.

In accordance with an embodiment, each server machine in the cluster wakes up periodically, for example every second, and randomly selects another server machine to ping 411-416. The pinged machine is then expected to respond to the ping within a particular (short) amount of time. If there is a series of pings that are not responded to, then it is declared that the server machine has shut down and that all nodes on that machine are dead. For example, in accordance with one embodiment, the default configuration can be set to 15 second timeout, where each ping is waited on for 2 seconds.

In accordance with an embodiment, quorum policies can also be used to determine whether the data grid cluster can kill a particular machine, or a fraction of the server machine cluster, in order to prevent undesirable situation in the cluster such as a split-brain scenario. Additionally, the quorum policies can be user defined policies or vendor supplied policies. These quorum polices can take higher precedence over the data grid cluster itself. For example a quorum policy can define that the data grid cluster can not kill ten nodes at once, since that can cause severe shortage of resources in the cluster. Additional descriptions of various embodiments of using quorum policies in a data grid cluster are provided in U.S. patent application Ser. No. 13/352,203, filed Jan. 17, 2012, entitled "SYSTEM AND METHOD FOR USING CLUSTER LEVEL QUORUM TO PREVENT SPLIT BRAIN SCENARIO IN A DATA GRID CLUSTER" and U.S. patent application Ser. No. 13/352,209, filed Jan. 17, 2012, entitled "SYSTEM AND METHOD FOR SUPPORTING SERVICE LEVEL QUORUM IN A DATA GRID CLUSTER", each of which applications are herein incorporated by reference.

Figure 5:
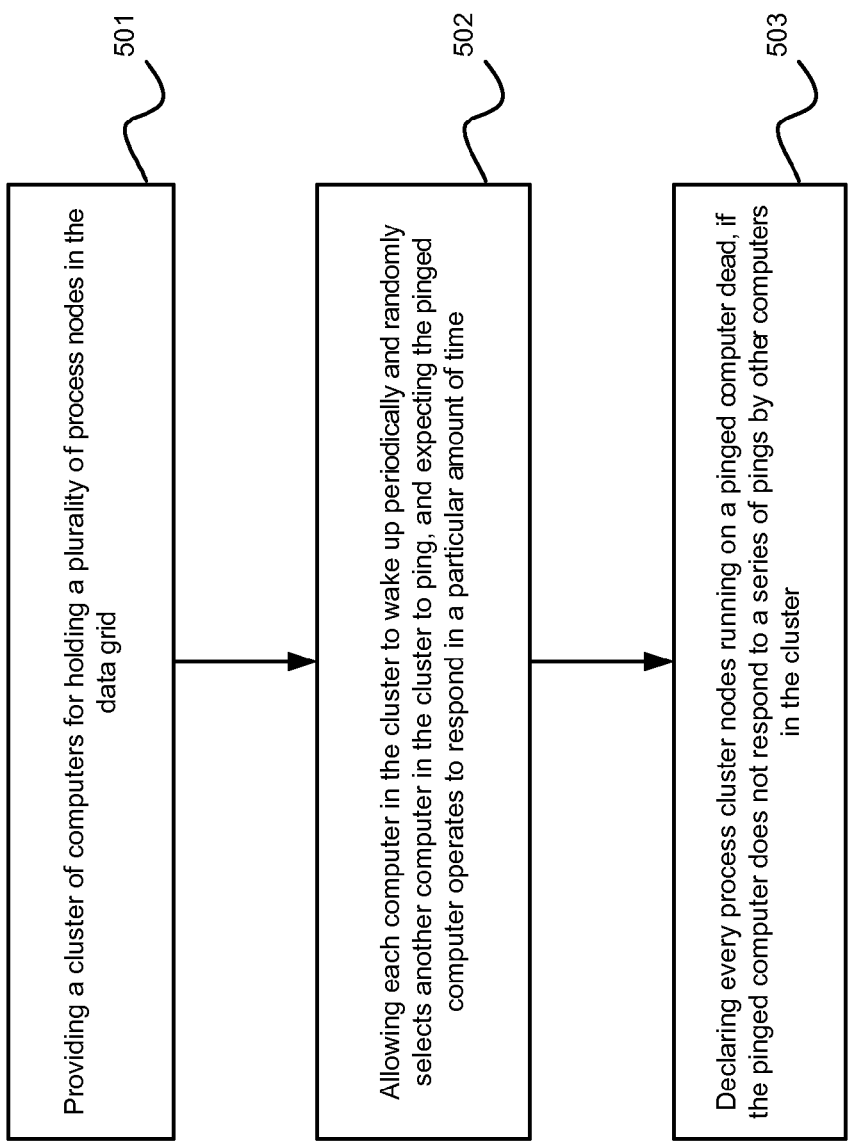
FIG. 5 illustrates an exemplary flow chart for using IP monitor to support death detection in a data grid cluster, in accordance with an embodiment.

FIG. 5 illustrates an exemplary flow chart for using IP monitor to support death detection in a data grid cluster in accordance with an embodiment. As shown in FIG. 5, at step 501, a cluster of computers are provided for holding a plurality of process nodes for the data grid cluster. At step 502, the data grid cluster allows each computer in the cluster to wake up periodically and randomly selects another computer in the cluster to ping, and expects the pinged computer operates to respond in a particular amount of time. At step 503, if the pinged computer does not respond to a series of pings by other computers in the cluster, the grid can declare that every process cluster nodes running on the pinged computer are dead at step 503.

Packet Timeout

In accordance with an embodiment, a packet timeout approach, which acts a catch-all death detection (process, machine, and network) feature, can be use with a data grid cluster to support death detection when other death detection features are disabled in the data grid. For example, a server machine or computer in the cluster can use a packet publisher's resend timeout interval to determine that another member has stopped responding to UDP packets. Every time when a packet is transmitted across the cluster and no acknowledgement is received, the packet will be re-sent. In one example, the default timeout interval can be set to 5 minutes. If no acknowledgement is received for a certain number of consecutive re-transmissions, then the node can be declared dead.

Additionally, quorum policies can be used as part of the packet timeout approach. As described above, these quorum polices can take higher precedence over the data grid cluster itself. A voting process can also be used in the packet timeout approach, where the cluster nodes in the data grid cluster can conduct a vote to decide which nodes should be ousted from the cluster.

Death Detection Configuration

In accordance with an embodiment, death detection can be configured to work by creating a ring of TCP connections between all cluster members. The TCP communication can be sent on the same port that is used for cluster UDP communication. Each cluster member issues a unicast heartbeat, and the most senior cluster member issues a cluster heartbeat, which is a broadcast message. Each cluster member uses the TCP connection to detect the death of another node within the heartbeat interval. The death detection feature can be enabled by default, and can be configured within, e.g. a <tcp-ring-listener> element, or in a configuration file, such as an operational override file. Settings can be used to change the default behavior of the TCP-ring listener. This includes changing the amount of attempts and time before determining that a computer that is hosting cluster members has become unreachable. For example, the default setting can be 3 attempts and 15 seconds, respectively. The TCP/IP server socket backlog queue can also be set and defaults to the value used by the operating system.

Listing 1 illustrates a configuration file that can be used to change the settings, in accordance with an embodiment.

Listing 1

```
<?xml version='1.0'?>
<coherence xmlns:xsi="http://www.w3.org/2001/XMLSchema-instance"
    xmlns="http://xmlns.oracle.com/coherence/coherence-operational-config"
    xsi:schemaLocation="http://xmlns.oracle.com/coherence/
    coherence-operational-config coherence-operational-config.xsd">
    <cluster-config>
        <tcp-ring-listener>
            <ip-timeout system-property="tangosol.coherence.ipmonitor.pingtimeout">
            10s
            </ip-timeout>
            <ip-attempts>2</ip-attempts>
            <listen-backlog>10</listen-backlog>
        </tcp-ring-listener>
    </cluster-config>
</coherence>
```

In accordance with an embodiment, a system property can be used to specify a timeout, instead of using the operational override file. For example, this system property can be set to 20 seconds by configuring "-Dtangosol.coherence.ipmonitor.pingtimeout=20s." Additionally, the values of the <ip-timeout> and <ip-attempts> elements can be high enough to insulate against allowable temporary network outages.

In accordance with an embodiment, the death detection heartbeat interval can be changed. A higher interval alleviates network traffic but also prolongs detection of failed members. The default heartbeat value is 1 second. Listing 2 illustrates how to change the death detection heartbeat interval from within an operational override file, in accordance with an embodiment.

Listing 2

```xml
<?xml version='1.0'?>
<coherence xmlns:xsi="http://www.w3.org/2001/XMLSchema-instance"
    xmlns="http://xmlns.oracle.com/coherence/coherence-operational-config"
    xsi:schemaLocation="http://xmlns.oracle.com/coherence/
    coherence-operational-config coherence-operational-config.xsd">
    <cluster-config>
        <packet-publisher>
            <packet-delivery>
                <heartbeat-milliseconds>5000</heartbeat-milliseconds>
            </packet-delivery>
        </packet-publisher>
    </cluster-config>
</coherence>
```

In accordance with an embodiment, death detection can be enabled by default, and/or can be explicitly disabled. Disabling death detection can alleviate network traffic, but also prolongs the detection of failed members. Listing 3 illustrates how to disable death detection from within an operational override file, in accordance with an embodiment.

Listing 3

```xml
<?xml version='1.0'?>
<coherence xmlns:xsi="http://www.w3.org/2001/XMLSchema-instance"
    xmlns="http://xmlns.oracle.com/coherence/coherence-operational-config"
    xsi:schemaLocation="http://xmlns.oracle.com/coherence/
    coherence-operational-config coherence-operational-config.xsd">
    <cluster-config>
        <tcp-ring-listener>
            <enabled>false</enabled>
        </tcp-ring-listener>
    </cluster-config>
</coherence>
```

In accordance with an embodiment, the packet resend timeout interval specifies the maximum amount of time, in milliseconds, that a packet continues to be resent if no ACK packet is received. After this timeout expires, a determination is made if the recipient is to be considered terminated. This determination takes additional data into account, such as if other nodes are still able to communicate with the recipient. The default value is 300000 milliseconds. For production environments, the recommended value is the greater of 300000 and two times the maximum expected full GC duration. Listing 4 illustrates how to change the packet resend timeout interval within the operational override file, in accordance with an embodiment.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Listing 4

```xml
<?xml version='1.0'?>
<coherence xmlns:xsi="http://www.w3.org/2001/XMLSchema-instance"
    xmlns="http://xmlns.oracle.com/coherence/coherence-operational-config"
    xsi:schemaLocation="http://xmlns.oracle.com/coherence/
    coherence-operational-config coherence-operational-config.xsd">
    <cluster-config>
        <packet-publisher>
            <packet-delivery>
                <timeout-milliseconds>420000</timeout-milliseconds>
            </packet-delivery>
        </packet-publisher>
    </cluster-config>
</coherence>
```

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for supporting fast process level death detection in a data grid cluster comprising a plurality of process nodes operating on a plurality of machines, each machine comprising a microprocessor, a first subset of the plurality of process nodes having a first role and a second subset of the plurality of process nodes having a second role, the method comprising:
maintaining a death detection socket open on each of the plurality of process nodes during operation of said each of the plurality of process nodes;
connecting the plurality of process nodes in the data grid cluster to form a main network ring, wherein each node in the main network ring watches another node in the main network ring;
connecting the first subset of the plurality of process nodes having the first role to form a first secondary ring wherein each of the first subset of the plurality of process nodes watches another of the first subset of the plurality of process nodes in the first secondary ring;
connecting the second subset of the plurality of process nodes having the second role to form a second secondary ring wherein each of the second subset of the plurality of process nodes watches another of the second subset of the plurality of process nodes in the second secondary ring;
detecting a death of a first process node of the plurality of process nodes by a second process node of the plurality of process nodes, when the second process node notices that said death detection socket on the first process node is closed; and
informing other process nodes of the plurality of nodes from the second process node that the first process node is dead.

2. The method according to claim 1: wherein:
each process node of said plurality of process nodes runs on a different one of said plurality of machines, thereby allowing a kernel or operating system (OS) on each different machine of the plurality of machines to determine whether the process node operating on said each different machine of the plurality of machines is dead.

3. The method according to claim 1, further comprising:
allowing each of the main network ring, the first secondary ring, and the second secondary ring to be a Transmission Control Protocol (TCP) rings, wherein each TCP ring uses a plurality of TCP network connections to link process nodes.

4. The method according to claim 1, wherein detecting closure of said death detection socket on the first process node by the second process node is deterministic that the first process node is dead.

5. The method according to claim 1, further comprising:
using an ordering scheme to connect said plurality of process nodes to form said main network ring, wherein the ordering scheme is based on seniority of each process node of said plurality of process nodes and operates to decide a monitoring order for the plurality of process nodes in said main network ring.

6. The method according to claim 5, further comprising:
allowing each process node of said plurality of process nodes in the main network ring to be monitored by a next senior-er process node of said plurality of process nodes in the main network ring, and allowing a senior-most node of said plurality of process nodes to be monitored by a youngest node of said plurality of process nodes.

7. The method according to claim 1, wherein the first role and the second role are different roles selected from cache server, proxy process, and management process.

8. The method according to claim 1, wherein said plurality of process nodes include a third subset of the plurality of process nodes having a third role, and the method further comprises:
connecting the third subset of the plurality of process nodes having the third role to form a third secondary ring.

9. The method according to claim 1, wherein said step of detecting a death of a first process node in the main network ring by a second process node comprises detecting the death of the first process node in less than a millisecond.

10. The method according to claim 1, further comprising:
creating user-defined secondary rings in the data grid cluster based on user-defined roles.

11. The method according to claim 1, further comprising:
automatically assigning a new process node in the data grid cluster to an existing network ring based on a role associated with the new process node.

12. The method according to claim 1, further comprising:
using an Internet Protocol (IP) monitor to detect machine or network related deaths.

13. The method according to claim 1, further comprising:
using a packet publisher's resend timeout interval to determine that a process node of the plurality of process nodes has stopped responding to User Datagram Protocol (UDP) packets.

14. The method according to claim 1, further comprising:
allowing a connection between the first process node and the second process node to belong to both the main network ring and one of said first secondary ring and said second secondary ring.

15. The method according to claim 1, further comprising:
allowing a connection between the first process node and the second process node to only belong to one of said first secondary ring and said second secondary ring.

16. The method according to claim 1, wherein said detecting step is performed in less than a millisecond after said death detection socket on the first process node is closed.

17. A system for supporting fast process level death detection in a data grid cluster, comprising:
a plurality of process nodes operating on a plurality of machines, each machine comprising a microprocessor, a first subset of the plurality of process nodes having a first role and a second subset of the plurality of process nodes having a second role;
wherein each of said plurality of process nodes maintains a death detection socket open during operation of said each of said plurality of process nodes;
a main network ring that connects all of said plurality of process nodes wherein each process node of the plurality of process nodes in the main network ring watches another process node of the plurality of process nodes in the main network ring;
a first secondary network ring that connects all of said first subset of the plurality of process nodes having a first role wherein each of the first subset of the plurality of process nodes watches another of the first subset of the plurality of process nodes in the first secondary ring;
a second secondary network ring that connects all of said second subset of the plurality of process nodes having a second role wherein each of the second subset of the plurality of process nodes watches another of the second subset of the plurality of process nodes in the second secondary ring;
wherein the data grid cluster operates to perform steps comprising:
detecting a death of a first process node of the plurality of process nodes in the main network ring by a second process node of the plurality of process nodes in the main network ring, when the second process node notices that the death detection socket on the first process node is closed; and
informing other process nodes of the plurality of process nodes in the main network ring from the second process node that the first process node is dead.

18. The system according to claim 17, wherein the data grid cluster is operative to detect death of the first process node by a second process node in less than a millisecond after said death detection socket on the first process node is closed.

19. The system according to claim 17, wherein:
the first secondary ring uses a first ordering scheme to connect the first subset of the plurality of process nodes, wherein the first ordering scheme is based on seniority of each process node of the first subset of the plurality of process nodes and operates to decide a monitoring order for the first subset of the plurality of process nodes in the first secondary network ring; and
the second secondary ring uses a second ordering scheme to connect the second subset of the plurality of process nodes, wherein the second ordering scheme is based on seniority of each process node of the second subset of the plurality of process nodes and operates to decide a monitoring order for the second subset of the plurality of process nodes in the second secondary network ring.

20. A non-transitory machine readable medium having instructions stored thereon for supporting fast process level death detection in a data grid cluster comprising a plurality of process nodes operating on a plurality of machines, each machine comprising a microprocessor, a first subset of the plurality of process nodes having a first role and a second subset of the plurality of process nodes having a second role, which instructions, when executed cause a system to perform the steps comprising:
maintaining a death detection socket open on each of the plurality of process nodes during operation of said each of the plurality of process nodes;
connecting the plurality of process nodes in the data grid cluster to form a main network ring, wherein each process node of the plurality of process nodes in the main network ring watches another process node of the plurality of process nodes in the main network ring;
connecting the first subset of the plurality of process nodes having the first role to form a first secondary ring wherein each of the first subset of the plurality of process nodes watches another of the first subset of the plurality of process nodes in the first secondary ring;
connecting the second subset of the plurality of process nodes having the second role to form a second secondary ring wherein each of the second subset of the plurality of process nodes watches another of the second subset of the plurality of process nodes in the second secondary ring;
detecting a death of a first process node of the plurality of process nodes by a second process node of the plurality of process nodes, when the second process node notices that said death detection socket on the first process node is closed; and
informing other process nodes of the plurality of process nodes in the main network ring from the second process node that the first process node is dead.

* * * * *

UNITED STATES PATENT AND TRADEMARK OFFICE
CERTIFICATE OF CORRECTION

PATENT NO. : 9,063,852 B2  Page 1 of 1
APPLICATION NO. : 13/352195
DATED : June 23, 2015
INVENTOR(S) : Falco et al.

It is certified that error appears in the above-identified patent and that said Letters Patent is hereby corrected as shown below:

Drawings

On sheet 3 of 5, in figure 3, under Reference Numeral 301, line 2, delete "anoher" and insert -- another --, therefor.

On sheet 3 of 5, in figure 3, under Reference Numeral 302, line 2, delete "connectionto" and insert --connection to --, therefor.

On sheet 5 of 5, in figure 5, under Reference Numeral 503, line 1, delete "  " and insert -- computer --, therefor.

Specification

In column 5, line 9, delete "can not" and insert -- cannot --, therefor.

Claims

In column 10, line 4, in Claim 2, delete "claim 1:" and insert -- claim 1, --, therefor.

Signed and Sealed this
First Day of March, 2016

Michelle K. Lee
*Director of the United States Patent and Trademark Office*